July 18, 1933.  G. L. RINGLAND  1,918,867

DYNAMO ELECTRIC MACHINE

Original Filed Oct. 23, 1922  3 Sheets-Sheet 1

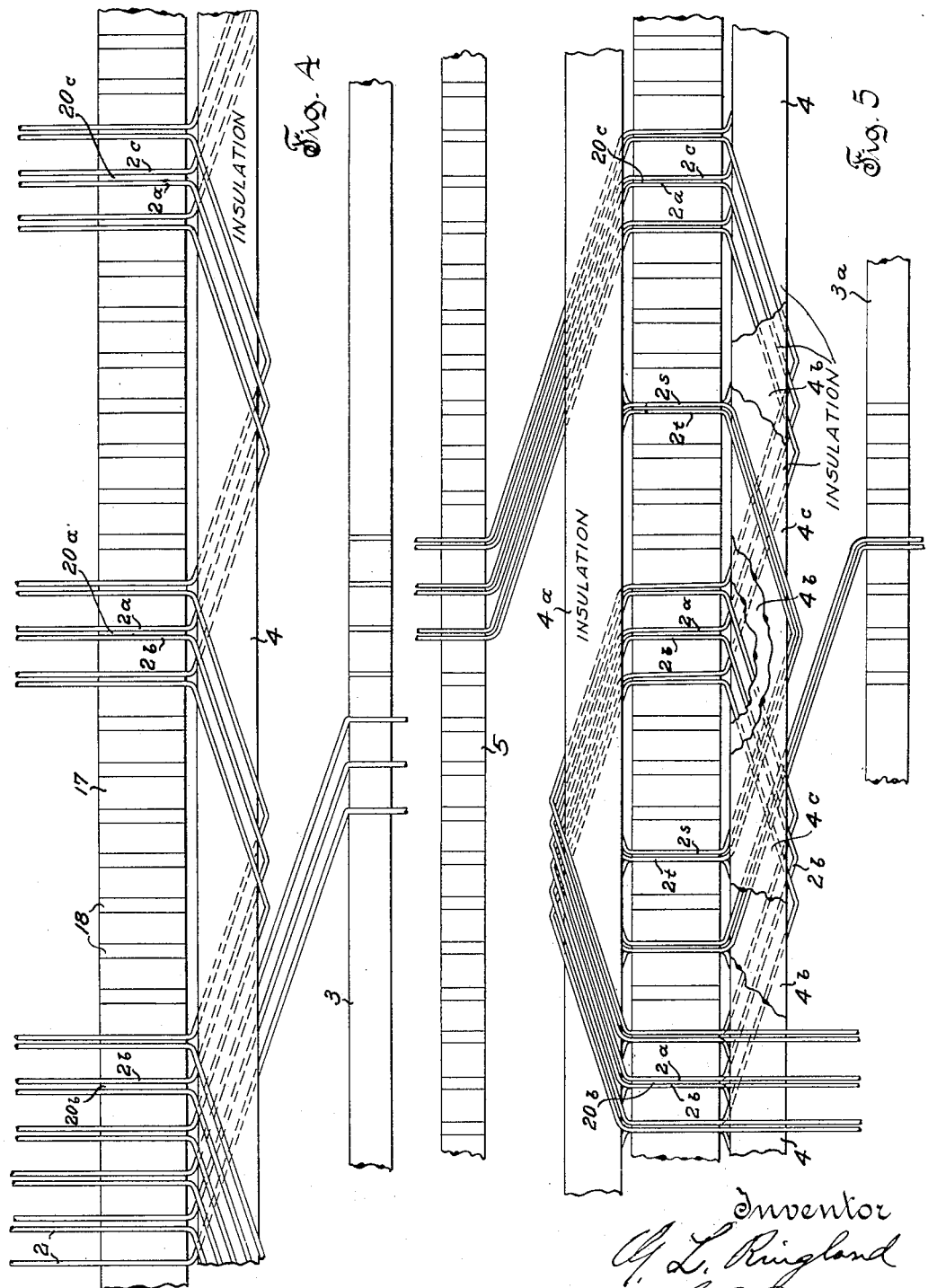

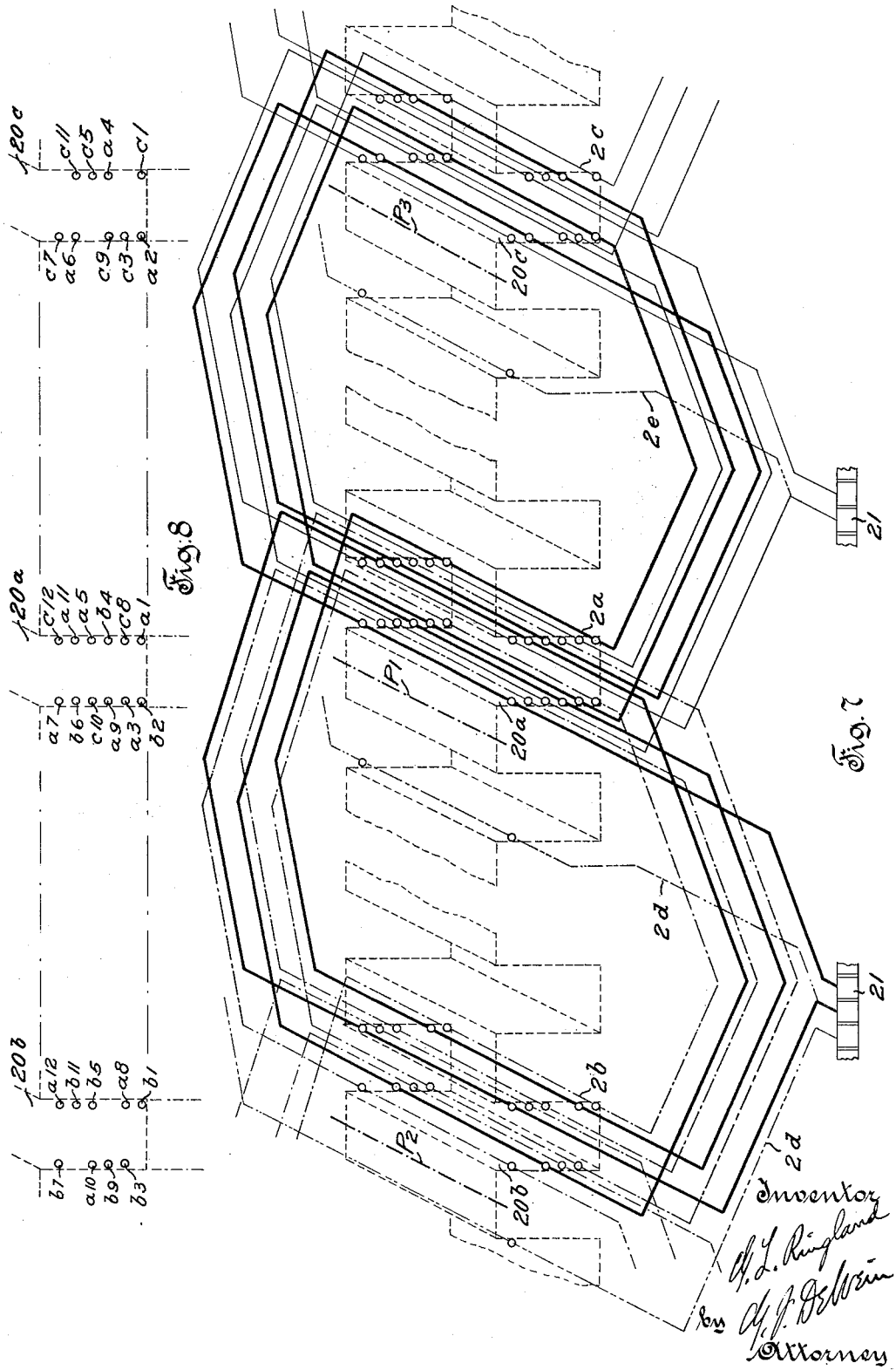

Patented July 18, 1933

1,918,867

UNITED STATES PATENT OFFICE

GEORGE L. RINGLAND, OF NORWOOD, OHIO, ASSIGNOR TO ALLIS-CHALMERS MANUFACTURING COMPANY, OF MILWAUKEE, WISCONSIN, A CORPORATION OF DELAWARE

DYNAMO-ELECTRIC MACHINE

Application filed October 23, 1922, Serial No. 596,384. Renewed July 29, 1932.

This invention relates in general to dynamo-electric machines and has particular relation to the design and formation of windings for such machines, especially such machines of the commutator type, as certain types of alternating current motors.

The present invention contemplates an improved design and formation of distributed winding for the slots of a dynamo-electric machine, especially a commutator type machine, such as an alternating current motor of the single-phase type, wherein the motor may be started as a repulsion motor and operated under normal running conditions with the rotor winding fully short-circuited through the commutator. This winding may embody coils made up of double turns to constitute an 8-shape and these coils may be in interlaced relation in the slots of the core, the ends being brought out conveniently for any desired interconnection and connection to commutator segments. The invention likewise contemplates an improved and conveniently practiced method of forming the coils and distributing the winding in proper position in the slots of the core.

It is an object of the present invention to provide an improved design and construction of distributed winding for dynamo-electric machines.

It is a further object of this invention to provide an improved design and construction of distributed winding for dynamo-electric machines, especially adapted for alternating current motors of the commutator type, and embodying a plurality of coils in interlaced relation in the slots of the core.

It is a further object of this invention to provide an improved method of forming and arranging a distributed winding in the slots of the core of a dynamo-electric machine.

These and other objects and advantages are secured by the present invention, various novel features of which will be apparent from the description and accompanying drawings, disclosing an embodiment of the invention, and will be more particularly pointed out in the claims.

In the accompanying drawings:

Figs. 2, 3, 4, 5 and 6 are developed plan views of the rotor of the machine of Fig. 1, showing the arrangement of portions of the winding in the slots and indicating stages of the winding operation.

Figs. 7 and 8 are diagrammatic showings disclosing the arrangement of one complete coil and portions of other coils in slots of the core of a dynamo-electric machine.

Figure 1:
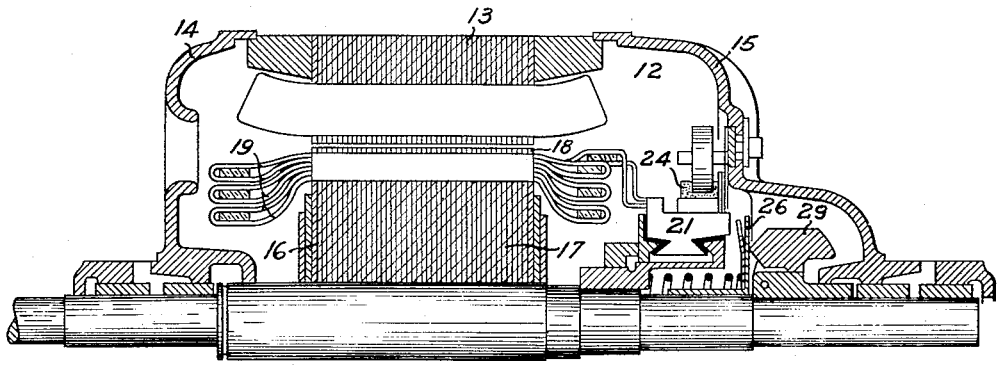
Fig. 1 is a broken vertical section of a dynamo-electric machine having a rotor provided with a winding formed and arranged in accordance with features of this invention.
Figure 2:
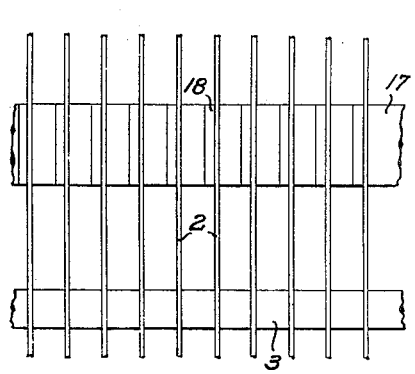

In the embodiment of the invention herein disclosed, the motor may be considered as an alternating current, single-phase motor of the commutator type wherein a stator 12 has windings disposed in slots at the inner periphery of a core 13 of assembled laminæ. The end housings 14 and 15 are secured in place in any suitable manner, and the rotor 16 of the motor has its shaft mounted in bearings carried by the end housings 14, 15. The rotor core 17 is provided with peripheral slots 18, and the rotor winding 19 is disposed therein, this winding being of a special type embodying features of the present invention, and portions of the winding are suitably connected to the bars of a commutator 21 which is mounted upon an overhanging support held in fixed relation to the shaft. A plurality of spring pressed brushes 24 are suitably mounted in operative position on the end housing 15 being maintained spaced apart to a distance corresponding to the polar pitch of the machine. These brushes are preferably adjustable as to position so as to provide for forward and reverse operation of the motor, as desired, and are connected together to accommodate for operation of the motor as a repulsion motor during the starting operation. A short-circuiting device 26 is provided for interconnecting the bars of the commutator. This short-circuiting device is normally urged away from the commutator, as by a spring, and is movable into short-circuiting engagement with the ends of the commutator bars by a plurality of weighted levers 29 mounted upon the shaft, or an element carried thereby. As will be apparent, these levers assume such position as causes the short-circuiting device to be forced into short-circuiting relation with the commutator when the speed of the motor is of suitably high value to insure stable operation of the motor as a straight induction motor.

The character of the winding and the method of arranging the same in the slots of the rotor core will probably be best understood in connection with the diagrammatic disclosure of Figs. 2 to 6, inclusive, showing the condition of the winding at various stages during the operation of forming and disposing the same in position in the core slots.

As a preliminary step, sections or lengths of wire 2 have their mid-portions laid in the core slots 18, a separate length or section of conductor for each slot, and the extending ends of each section being of substantially the same length. In the particular embodiment of the invention disclosed, each of these sections of conductor is of the required length to form an 8-shaped coil having three turns in each loop of the 8 and leads for connection to the commutator.

The ends of the conductors at the front side of the core are disposed in slots of a forming block 3, one conductor in each slot. This forming block may preferably be of annular shape with the slots arranged at the periphery of the block. The initial disposition of the elements will be readily apparent from Fig. 2.

Figure 3:
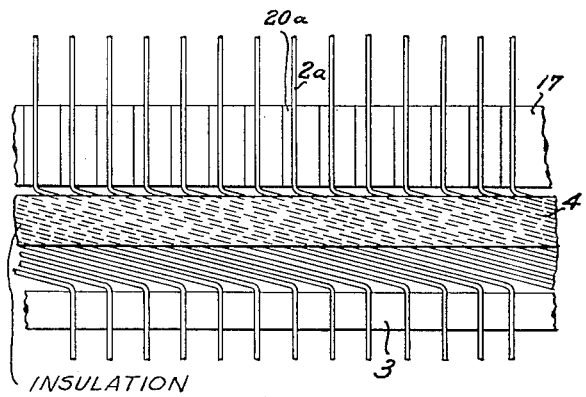

With temporary means provided for holding the conductors in their initial positions in the core slots, the forming block is rotated clockwise, about an axis substantially coincident with the rotor axis, to an extent equal to the pitch of the winding, as indicated in Fig. 3. A band of insulating material 4, occupying a little less than half the space between the core and the forming block, is laid upon the extending end portions of the conductors.

The formed ends of the conductors are then laid back lengthwise of the core, in slots separated by the winding pitch from the slots occupied by the mid-portion of the conductors. As will be apparent, the winding pitch may be the same as the polar pitch, as indicated. The portions of the conductor last laid in the slots are disposed beside the portions initially occupying the slots so as to lie in the same layer at the bottom of the several slots. Thus, each slot, such as the slot 20a, contains two conductors, 2a and 2b, forming inductor portions of different coils in the finished windings, and both ends of each conductor extend from the slots at the rear side of the core. The condition of the winding after the last described operation is indicated at the right in Fig. 4.

The ends of conductors now occupying each of the slots are maintained from this point on throughout the complete winding operation, in this same paired and parallel relation in the slots. The conductors of each pair extending at the rear side of the core are laid side by side in slots of a forming block 5, as indicated in Fig. 5. The forming block is then rotated anti-clockwise to an extent equal to the previously described clockwise rotation of the forming block 3. A band of insulation 4a is laid upon the extending end portions of the conductors at the rear side of the core, this insulation being of the same width as the insulation 4 at the front side of the core.

The pairs of extending end portions of the conductors are now carried forward, being turned together, as with a V-bend, about the insulation band, and laid in the proper core slots so as to maintain the inductor or slot-occupying portions of each coil the same circumferential distance apart. The initial forwardly extending portion of conductor 2a, as shown in Fig. 3, is now disposed in slot 20a, along with the initially rearwardly extending portion of conductor 2b, the two conductors being side by side in the slot and constituting the second layer of the winding in the slot. A band of insulation 4b is laid upon the first layer of front end turns to separate these end portions from the extending ends of the conductors last laid in the slots.

The pairs of extending end portions of the conductors at the front side of the core are disposed side by side in slots of a forming block 3a; and the forming block is rotated clockwise to the required angular extent, that is, the winding pitch, to dispose the unwound portions of the conductors opposite the proper slots. An additional band of insulation 4c is disposed upon these end portions just laid, in superposed relation with respect to the insulation 4 and 4b, and the conductors are bent about this insulation, as with a plain offset bend, and laid in appropriate slots, the conductors of each pair being still maintained in parallelism. The initial forwardly extending portion of conductor 2a is now disposed in slot 20c, with the initial rearwardly extending portion of conductor 2c, as shown in Fig. 4, these two conductors being side by side in the slot and constituting the third layer of winding in the slot. These latter two steps of laying the winding and forming the end turns at the rear and front sides of the core can be best understood in connection with Fig. 5.

This operation of winding the conductors in parallel laid pairs and forming the end turns, with insulation bands between adjacent layers of end turns, is continued in the general manner described in connection with the last two steps of the winding operation, until the winding is formed. In the particular embodiment of the invention described herein, there are six layers of conductors, with two conductors per layer, said conductors being in different coils, in each of the core slots. The ends of the pairs of conductors are brought from the outer side of the slots, at the front side of the core, in position to be conveniently bent and disposed for connection to the commutator segments. A suitable arrangement of the end turns of the paired conductors is secured through the use of plain offset bends at the front side of the core and V-bends at the rear side.

As indicated in Fig. 7, the coil $2a$ is shown in full, heavy black line, the coil $2b$ in dot and dash line, the coil $2c$ in light, full black line, the coil $2d$ in double dot and dash line and the coil $2e$ in triple dot and dash line.

In Fig. 8 the circles designated $a1$, $a2$, —$a12$ indicate the positions of inductor portions of the coil $2a$. Certain corresponding inductor portions of the coils $2b$ and $2c$ are similarly designated except that the letters $b$ and $c$ are used in place of the letter $a$. It will be noted that correspondingly numbered inductor portions of the several coils occupy similar positions in the several slots, the inductor portions $a1$, $b1$ and $c1$ being the middle portions of the lengths of wire from which the coils $2a$, $2b$ and $2c$, respectively, are made up.

The method of winding the several coils may be rendered apparent by considering the steps performed in laying or placing the coil $2a$. The wire from which this coil is formed is disposed with its middle part, corresponding to the inductor portion $a1$, in the slot $20a$, the forwardly extending portion thereof being bent at the front end of the core and laid in the position $a2$ in the slot $20c$ opposite the initially laid intermediate portion of the coil $2c$. These two conductors are then formed into a plurality of loops by laying the same successively to form the inductor portions $a3$ and $c8$ in slot $20a$, the inductor portions $a4$ and $c9$ in slot $20c$, the inductor portions $a5$ and $c10$ in slot $20a$, the inductor portions $a6$ and $c11$ in slot $20c$ and the inductor portions $a7$ and $c12$ in slot $20a$, the forwardly extending ends of the two conductors being brought out to suitable segments of the commutator 21, as indicated. Simultaneously with the laying or placing of the parallel inductor portions of the coils $2a$ and $2c$ in the slots $20a$ and $20c$, the rearwardly extending portion of the coil $2a$ is laid with the forwardly extending portion of the conductor $2b$ whose intermediate portion occupies the position $b1$ in slot $20b$. As explained hereinabove, these two conductors are maintained in parallel relation while being formed into a plurality of loops having inductor portions in the slots $20a$ and $20b$. In forming these loops, the inductor portions $a8$ and $b3$ are laid in the slot $20b$, the inductor portions $a9$ and $b4$ in the slot $20a$, the inductor portions $a10$ and $b5$ in the slot $20b$, the inductor portions $a11$ and $b6$ in the slot $20a$ and the inductor portions $a12$ and $b7$ in the slot $20b$, the forwardly extending ends of the two conductors being then brought out to the proper segments of the commutator 21, as indicated. The terminal portion extending forwardly from the inductor portion $a12$ of the coil $2a$ is connected to the same commutator segment as the forwardly extending portion of the coil $2d$ which corresponds to the inductor portion $a7$ of the coil $2a$; and the inductor portion of the coil $2e$, which corresponds to the inductor portion $c7$ of the coil $2c$, this coil $2e$ having its initial inductor portion $e1$ and its terminal inductor portion $e7$ in the slot adjacent the slot $20c$ in the direction of the slot $20a$, is connected to the same segment as the forwardly extending portion of the inductor $c7$.

From the above explanation and the fact that each 8-shaped coil has its inductor portions similarly interlaced with inductor portions of two other coils having inductor portions in a slot a polar pitch removed from the first slot, the method of laying the entire winding and connecting the same to the commutator segments will be fully apparent. P1, P2 and P3 represent polar centers, the periphery of the core included between the pole centers P2 and P3 corresponding to 360 electrical degrees. From this it will be apparent that the loops of the individual coils embrace 180 electrical degrees.

Figure 6:
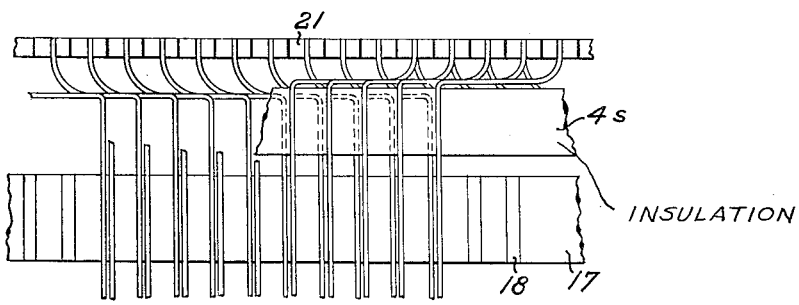

In Fig. 6, there is indicated a suitable arrangement for bringing out the ends of the paired conductors from the outer layer in the core slots. As indicated, the corresponding extending ends of the several conductors are separated as a group from the other group of ends, and an insulation band $4s$ is inserted between the two groups of extending end portions. The ends of each pair of conductors are carried in opposite directions and connected to other conductor ends and to commutator segments, as may be required by conditions of design.

It may be desirable during the above winding operation, especially during the operation of rotating the forming blocks, to hold the inductor portions of the winding already laid in the slots, firmly in position, as by means of temporary wedges, and to hold the loose ends of the wires properly paired by eyelets strung on a ring of considerably greater diameter than the core and supported at an adjustable distance from the core.

The arrangement described and illustrated herein produces a winding embodying a plurality of coils, one for each slot of the core, these coils being of 8-shape and having three radially superposed turns in each loop of the 8 and the sides of the loops being spaced apart in accordance with the pitch. Further, there are six layers of inductor portions of conductors in each slot, two conductors per layer, and six of these inductor portions being parts of one coil of the winding, the remaining six conductors being equally divided as between two other coils. The inductor portions of the coils are symmetrically distributed in each slot, that is, are substantially uniformly graded as to radial depth therein, insuring a substantial balance of inductive effects in the several coils. Windings are omitted from certain slots merely for convenience of illustration.

In addition to the insulating separating bands laid on the end turns of the winding, a layer of binding twine or wire may be laid to insure holding of the end turns in proper position.

It will be apparent that the method of connection of the winding to the commutator segments may be modified as desired, depending upon the type and purpose of winding used, as for instance, series, parallel, progressive, etc., windings, and also according to the position desired for the brushes.

It should be understood that the invention claimed is not limited to the particular design and construction or method shown and described, for obvious modifications will be apparent to one skilled in the art.

It is claimed and desired to secure by Letters Patent:

1. A winding coil for a dynamo-electric machine core of the non-salient pole type, said coil being normally of 8-shape and comprising three spaced inductor portions with an intermediate inductor portion spaced from inductor portions at each side of said intermediate inductor portion a distance equal to approximately the polar pitch of the machine.

2. A winding coil for a dynamo-electric machine of the non-salient pole type, said coil being of 8-shape and comprising three spaced inductor portions connected in series relation and with an intermediate inductor portion spaced from inductor portions at each side of said intermediate inductor portion a distance equal to approximately the polar pitch of the machine.

3. A winding coil for a dynamo-electric machine core of the non-salient pole type, said coil being of 8-shape and formed from a single length of conductor, each loop of the 8-shape comprising a plurality of turns, and said coil comprising three spaced inductor portions with the intermediate inductor portion spaced to substantially the same extent from the inductor portions at each side of said intermediate inductor portion.

4. In a winding for a dynamo-electric machine core of the non-salient pole type, a coil adapted for placement in peripheral slots of said machine and having more than two inductor portions, an intermediate one of said inductor portions being spaced from other inductor portions on each side of said first inductor portion a distance substantially corresponding to the polar pitch of the machine.

5. In a winding for a dynamo-electric machine core of the non-salient pole type, a coil of 8-shape, each loop of the 8-shape comprising a plurality of series connected portions, and the ends of the coil emerging at the side of inductor portions of the coil which occupy an outermost position when the coil is in operative position in slots of the core.

6. In a winding for a dynamo-electric machine core of the non-salient pole type, a coil of 8-shape, each half of the 8-shape comprising a plurality of portions connected in series, the ends of the coil emerging at the radially outer side of spaced inductor portions.

7. A winding coil for a dynamo-electric machine core of the non-salient pole type, said coil being of 8-shape and having inductor portions in at least three groups, the inductor portions of each group adapted to occupy the same slot of said machine and the intermediate group of inductor portions being spaced to substantially the same extent from the inductor portions on each side thereof, and each half of the 8-shaped coil comprising a plurality of turns.

8. In a winding for a dynamo-electric machine core of the non-salient pole type, a coil adapted for placement in peripheral slots of the machine, said coil comprising a plurality of circumferentially disposed loops each having an inductor portion intermediate the sides of the coil and in position for placement in the same slot, and the ends of the coil disposed to emerge from the outer side of the slots.

9. In a winding for a dynamo-electric machine core of the non-salient pole type, a coil of 8-shape having at least three spaced groups of at least two inductor portions connected in series, the ends of said coil being brought out at the outer side of spaced inductor portions.

10. A dynamo-electric machine having a peripherally slotted core, and a winding arranged in the slots of said core, said winding comprising a plurality of coils each having inductor portions in at least three spaced slots, and a greater number of inductor portions in an intermediate one of said slots than in either of the outside slots.

11. In combination with a peripherally slotted core of a dynamo-electric machine, a winding arranged in slots of said core, said winding comprising a plurality of series connected coils each formed from a single length of conductor having a plurality of radially superposed portions in at least three spaced slots.

12. In combination with a peripherally slotted core of a dynamo-electric machine, a winding arranged in slots of said core, said winding comprising a plurality of 8-shaped coils, and each slot containing inductor portions of at least three coils.

13. In combination with a peripherally slotted core of a dynamo-electric machine, a winding arranged in slots of said core, said winding comprising a plurality of 8-shaped coils each formed from a single length of conductor, and each slot containing inductor portions of at least three coils, the inductor portions of each coil being balanced as to inductive position in said slots.

14. In combination with a peripherally slotted core of a dynamo-electric machine, a winding arranged in slots of said core, said winding comprising a plurality of coils, each having inductor portions in at least three spaced slots, the ends of all the coils emerging from the slots at the same relative position.

15. In combination with a peripherally slotted core of a dynamo-electric machine, a winding arranged in slots of said core, said winding comprising a plurality of series connected coils of 8-shape, each loop of said 8-shape having a plurality of radially superposed turns, the inductor portions of each coil in a slot being in balanced inductive position therein, and the ends of said coils leaving the slots at the outer side thereof.

16. In combination with a peripherally slotted core of a dynamo-electric machine, a winding arranged in slots of said core, said winding comprising a plurality of 8-shaped coils each having a plurality of radially superposed inductor portions in spaced slots, said winding including a plurality of parallel laid turns of different coils interlaced in a plurality of slots with similarly laid portions of another set of coils.

17. In combination with a peripherally slotted core of a dynamo-electric machine, a winding arranged in slots of said core, said winding comprising a plurality of coils each formed from a single length of conductor, said winding including a pair of parallel laid turns of different coils disposed in the same pair of slots and interlaced with similarly laid portions of another pair of coils, the ends of said coils being brought out in pairs in the same layer at the outer side of the slots.

18. In a dynamo-electric machine of the commutator type suitable for operation as a single-phase alternating current motor, a peripherally slotted core, and a winding distributed in slots of said core, said winding comprising a plurality of 8-shaped coils each having a plurality of turns in each loop of the 8-shape, the ends of said coils emerging at the outer side of the slots.

19. A method of forming a distributed winding for a dynamo-electric machine, which comprises disposing mid-portions of separate conductors in peripheral slots of the core of said machine, shaping the extending portions of said conductors in the form of a plurality of loops having inductor portions disposed in slots at opposite sides of the slot occupied by the mid-portions of the conductors.

20. A method of forming a distributed winding for a dynamo-electric machine, which comprises disposing mid-portions of separate conductors in peripheral slots of the core of said machine, shaping and disposing the extending portion of each conductor at one side of said core in a slot spaced from the slot occupied by said mid-portion, shaping said extending portion with the opposite extending portion of the conductor originally disposed in said second slot, and laying the extending portions of said two conductors in said first slot while maintaining them in parallel relation.

21. A method of forming a distributed winding for a dynamo-electric machine, which comprises disposing mid-portions of separate conductors in peripheral slots of the core of said machine, shaping and disposing the extending portion of each conductor at one side of said core in a slot spaced from the slot occupied by the mid-portion of said conductor and shaping and laying said extending portion and an extending portion of the conductor originally disposed in said second slot in a plurality of parallel laid turns in said two slots, with said parallel conductors constituting separate layers in said slots.

22. A method of forming a distributed winding for a dynamo-electric machine which comprises disposing an intermediate portion of a conductor in a peripheral slot of the machine, and forming from each of the extending portions a loop which has a portion disposed in said slot and in a slot spaced from said first slot, with the loops formed by the two extending portions disposed on opposite circumferential sides of said first slot.

23. A dynamo electric machine of the commutating type, having an armature winding comprising coils, each coil comprising a plurality of conductors, two of said conductors of each coil being located substantially 360 electrical degrees apart and another of said conductors of each coil being located substantially 180 electrical degrees from each of said first mentioned conductors.

24. A dynamo electric machine having an armature, said armature comprising a commutator and an armature winding, said armature winding comprising coils, each coil comprising a plurality of conductors, two of said conductors of each coil being substantially 360 electrical degrees apart and another of said conductors of each coil being located substantially 180 electrical degrees from each of said first mentioned conductors, the ends of at least two of said conductors at the commutator end of said armature being connected to said commutator.

25. The method of winding coils into spaced slots of an armature core, which includes so winding a coil about the core that a portion of the coil-forming conductor is located other than in the slot which it is to occupy normally while the remaining portion of the coil-forming conductor is disposed on the core with the active coil sides formed therefrom in slots of the core, then winding other turns of a coil so that both active coil sides of these other turns will be located in core slots, and then disposing said first portion of the coil-forming conductor so as to cause any active coil side formed therefrom to be located in a core slot upon other coil sides therein and so that the coil leads will emerge from the two end active coil sides substantially the same distance from the periphery of the core.

26. In a dynamo-electric machine of the commutator type, an armature comprising in combination, a slotted armature core and a plurality of coils wound into slots of the core, each core slot receiving coil sides of a plurality of coils whose axes are circumferentially displaced with respect to each other, and with a coil side of one coil disposed radially outside of a coil side of another coil in the same slot, and each of said coils having its end active coil sides located adjacent the periphery of said core.

27. In a dynamo-electric machine of the commutator type, an armature comprising in combination, a slotted armature core and a plurality of multi-turn coils wound into slots of the core, each core slot receiving coil sides of a plurality of multi-turn coils whose axes are circumferentially displaced with respect to each other, and with coil sides of each coil radially displaced with respect to coil sides of another coil in the same slot, and the end active coil sides of said coils being disposed adjacent the open end of the slots.

28. A dynamo-electric machine of the commutating type, having a slotted armature provided with a winding in said slots, and a commutator to which said winding is connected at distributed points, said armature winding comprising a plurality of coils, each coil including a plurality of slot-occupying conductor portions, two of said conductor portions being located substantially 360 electrical degrees apart and another of said conductor portions being located substantially 180 electrical degrees from each of said first mentioned conductor portions.

29. A dynamo-electric machine of the commutating type, having a slotted armature provided with a winding in said slots, and a commutator to which said winding is connected at distributed points, said winding comprising a plurality of coils, each coil including three conductor portions occupying separate slots, the intermediate one of said conductor portions being substantially equally spaced from the two outside ones of said conductor portions.

30. The method of winding multi-turn coils into spaced slots of an armature core, which includes winding a portion of the coil about the core so as to dispose at least one turn of the coil into core slots while another portion of the coil containing an end active coil side of the finally formed coil remains outside of its slot, and disposing the remainder of said coil in the slots with both end active coil sides positioned in the outer part of the slots upon other coil sides therein.

GEORGE L. RINGLAND.